(12) United States Patent
Dai et al.

(10) Patent No.: US 8,177,998 B2
(45) Date of Patent: May 15, 2012

(54) LITHIUM-LOADED LIQUID SCINTILLATORS

(75) Inventors: Sheng Dai, Knoxville, TN (US); Banu Kesanli, Mersin (TR); John S. Neal, Knoxville, TN (US)

(73) Assignee: UT-Battelle, LLC, Oak Ridge, TN (US)

(*) Notice: Subject to any disclaimer, the term of this patent is extended or adjusted under 35 U.S.C. 154(b) by 243 days.

(21) Appl. No.: 12/605,408

(22) Filed: Oct. 26, 2009

(65) Prior Publication Data

US 2011/0095231 A1    Apr. 28, 2011

(51) Int. Cl.
*C09K 11/06* (2006.01)
*C09K 11/04* (2006.01)
*G01T 3/06* (2006.01)

(52) U.S. Cl. ............... 252/301.17; 252/646; 250/390.11

(58) Field of Classification Search ............. 252/301.17, 252/600, 625, 646; 250/390.11
See application file for complete search history.

(56) References Cited

U.S. PATENT DOCUMENTS

| | | | |
|---|---|---|---|
| 7,126,148 B2 | 10/2006 | Murray et al. | |
| 7,572,392 B2 * | 8/2009 | Clothier et al. | 252/301.6 P |
| 2004/0104500 A1 | 6/2004 | Bross et al. | |
| 2005/0224720 A1 * | 10/2005 | Dai et al. | 250/390.11 |
| 2006/0054863 A1 * | 3/2006 | Dai et al. | 252/301.408 |
| 2007/0272874 A1 * | 11/2007 | Grodzins | 250/390.11 |
| 2008/0166286 A1 | 7/2008 | Clothier et al. | |

OTHER PUBLICATIONS

United States Statutory Invention Registration No. H590, published Feb. 7, 1989 to Chiles et al.
Ait-Boubker S. et al., "Thermal Neutron Detection and Identification in a Large Volume with a New Lithium-6 Loaded Liquid Scintillator", *Nuclear Instruments and Methods in Physics Research* A, 277:461-466 (1989).
Greenwood L.R. et al., "$^6$Li-Loaded Liquid Scintillators With Pulse-Shape Discrimination", *Rev. Sci. Instrum.*, 50(4):472-477 (1979).
Ross H.H. et al., "A New Liquid Scintillator for Thermal Neutron Detection", *Nuclear Science and Engineering*, 20:23-27 (1964).
Klein H. et al., "Scintillation Detectors for Fast Neutrons", *Proceedings of Science*, pp. 1-23 (2006).
Saengkerdsub S. et al., "Nanocrystal-Based Scintillators for Radiation Detection", *AIP Conference Proceedings*, 632(1):220-224 (2002).
Hejwowski J., "Lithium Loaded Liquid Scintillator", *Rev. Sci. Instr.*, 32:1057-1058 (1961).
Kesanli B. et al., "New Copolymer Architectures for Next Generation Plastic Neutron Scintillators", *2008 Symposium on Radiation Measurements and Applications (SORMA West 2008)*, Berkeley, CA, Jun. 2-5, 2008 (Presentation made on Jun. 4, 2008, Stanley 105-3).

* cited by examiner

*Primary Examiner* — Jerry Lorengo
*Assistant Examiner* — Lynne Edmondson
(74) *Attorney, Agent, or Firm* — Scully, Scott, Murphy & Presser, P.C.

(57) ABSTRACT

The invention is directed to a liquid scintillating composition containing (i) one or more non-polar organic solvents; (ii) (lithium-6)-containing nanoparticles having a size of up to 10 nm and surface-capped by hydrophobic molecules; and (iii) one or more fluorophores. The invention is also directed to a liquid scintillator containing the above composition.

20 Claims, 2 Drawing Sheets

US 8,177,998 B2

LITHIUM-LOADED LIQUID SCINTILLATORS

This invention was made with government support under Contract Number DE-AC05-00OR22725 between the United States Department of Energy and UT-Battelle, LLC. The U.S. government has certain rights in this invention.

FIELD OF THE INVENTION

The present invention relates generally to liquid scintillators, and more particularly, to lithium-loaded liquid scintillators.

BACKGROUND OF THE INVENTION

Scintillators have found widespread usage for the detection of neutron radiation, as emitted by many radioactive sources. Liquid scintillators loaded with neutron absorbers generally possess a better pulse shape discrimination (PSD) than solid scintillators, and thus, are preferred when discrimination between neutron and gamma events are required.

Typically, isotopes with high cross sections, such as $^{10}$B, $^6$Li, and Gd, are used for neutron capture reactions. The energy emitted by the neutron capture reaction is generally made visible by the inclusion of a fluorophore that absorbs the energy and emits it as visible light. There is also the possibility that the neutron absorber also functions as a fluorophore.

Lithium-6 doped scintillators are particularly attractive due to the large Q value (i.e., 4.8 MeV) and high photon yield released as a result of the lithium-6 producing an alpha ($^4$He) and tritium ($^3$H) particle along with emitted energy. Lithium-6 doped scintillators also advantageously do not generate secondary gamma rays.

However, there are at least two properties of current lithium-loaded liquid scintillators that significantly limit their use. These properties include a generally lower than optimum light output and a lower than optimum PSD for distinguishing neutron events from gamma events. The most significant obstacle in improving these characteristics of lithium-loaded liquid scintillators has been the very low loading capability of lithium compounds (e.g., lithium salicylate and lithium propionate) in non-polar solvents (e.g., toluene and xylene). Although solid neutron scintillators with high lithium content are available, the lack of discrimination against gamma radiation limits their applications.

Numerous efforts have been undertaken to increase the lithium loading in liquid scintillators. However, these efforts have met with little success. For example, efforts to increase the lithium loading by incorporating a higher weight percentage of the lithium compound in a non-polar liquid generally results in clouding of the liquid. Clouding of the liquid significantly reduces the light output and PSD characteristics of the liquid scintillator. The liquid needs to be substantially transparent in order for the scintillator device to function in an effective manner. Other efforts include incorporating a more polar solvent (e.g., methanol or water) into the liquid scintillator in order to increase the lithium loading since the lithium salts tend to be significantly more soluble in water and other polar solvents than in non-polar solvents. However, this methodology has generally resulted in poor light output and PSD characteristics because of the adverse effects, such as quenching of scintillation, of polar solvents in liquid scintillators.

Accordingly, there is a need for new liquid scintillator compositions with significantly higher lithium loading in non-polar solvents while remaining substantially transparent (preferably, completely transparent, i.e., non-turbid) in these solvents. Such liquid scintillator compositions would advantageously possess significantly higher light outputs and PSD characteristics.

SUMMARY OF THE INVENTION

As a primary objective, the invention is directed to a liquid scintillating composition which contains (lithium-6)-containing nanoparticles of an optimized size range (i.e., within 1-10 nm) such that a significantly increased lithium loading is made possible in a variety of non-polar solvents while transparency is maintained in the resulting lithium-loaded liquid compositions. In a preferred embodiment, the liquid scintillating composition includes (i) one or more non-polar organic solvents; (ii) (lithium-6)-containing nanoparticles having a size of up to 10 nm and surface-capped by hydrophobic molecules; and (iii) one or more fluorophores. The invention is also directed to liquid scintillator devices containing such liquid compositions.

DETAILED DESCRIPTION OF THE INVENTION

Figure 1:
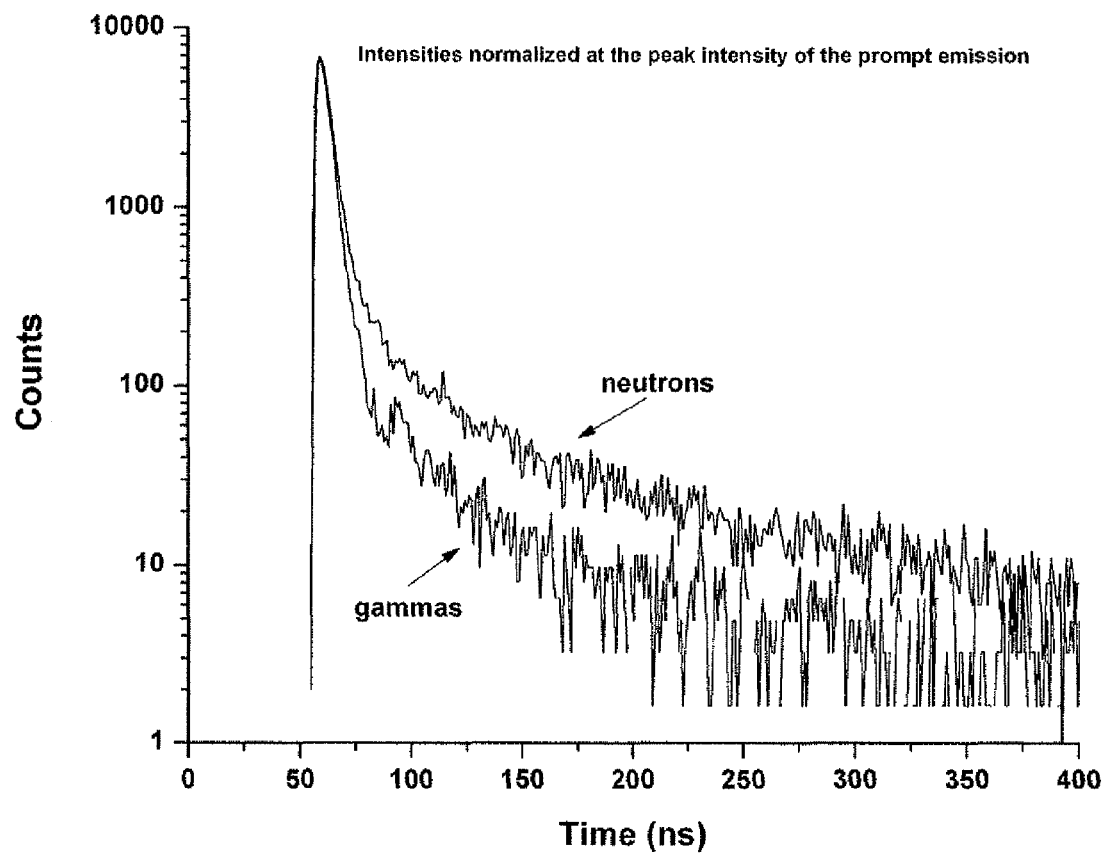
FIG. 1. Graph showing time distribution of light emission in lithium-6 (1.0 wt %) loaded liquid scintillator prepared by Route II (i.e., $^6$Li$_3$PO$_4$ nanoparticles loaded in EJ-301 commercial liquid scintillator).

In a first aspect, the invention is directed to a liquid scintillating composition containing at least (i) one or more non-polar organic solvents; (ii) (lithium-6)-containing nanoparticles (i.e., "lithium-containing nanoparticles") having a size of 1-10 nm and surface-capped by hydrophobic groups; and (iii) one or more fluorophores. The lithium loading of the liquid scintillating composition is preferably at least 0.5 weight percent (i.e., by total weight of the liquid scintillating composition), and more preferably, at least 1.0 wt %, 1.5 wt %, or 2.0 wt %.

The lithium-containing nanoparticles can have any suitable composition. Some examples of suitable compositions include lithium silicates, lithium aluminates (e.g., LiAlO$_2$, LiAl$_5$O$_8$), lithium oxide (Li$_2$O), and lithium zirconates (e.g., Li$_2$ZrO$_3$). Some examples of lithium silicates include lithium orthosilicate (Li$_4$SiO$_4$), lithium metasilicate (e.g., Li$_2$SiO$_3$), and hexalithium metasilicate (Li$_6$SiO$_5$), as well as their mixed alkoxide and hydroxide precursors or derivatives. In a particularly preferred embodiment, the lithium-containing nanoparticles have a lithium-6 phosphate (i.e., $^6$Li$_3$PO$_4$) composition.

The lithium-containing nanoparticles preferably have a size (i.e., particle size) of up to or less than 10 nm. The reason for this is that it has been found herein that lithium-containing nanoparticles greater than 10 nm possess such a low solubility in non-polar solvents, even when they are surface-derivatized with hydrophobic capping molecules, that the liquid scintillating composition (i.e., the "solution") is significantly increased in turbidity, and thus, significantly reduced in transparency. Conversely, it has surprisingly been found by the present inventors that a particle size of no more than 10 nm, and preferably less than 10 nm, can suitably dissolve in the non-polar matrix of the solution to provide a transparent solution, while providing a significantly increased lithium loading than previously known. In different embodiments, the lithium-containing nanoparticles preferably possess a size of about 1 nm, 2 nm, 3 nm, 4 nm, 5 nm, 6 nm, 7 nm, 8 nm, 9 nm, or 10 nm, or a size within a particular range bounded by any two of the foregoing values. For example, in different embodiments, the size of the lithium nanoparticles is preferably within a range of 2-10 nm, 2-9 nm, 2-8 nm, 2-7 nm, 2-6 nm, 2-5 nm, 2-4 nm, 2-3 nm, 3-10 nm, 3-9 nm, 3-8 nm, 3-7 nm, 3-6 nm, 3-5 nm, 4-10 nm, 4-9 nm, 4-8 nm, 4-7 nm, 4-6 nm, 5-10 nm, 5-9 nm, 5-8 nm, 5-7 nm, 6-10 nm, 6-9 nm, 6-8 nm, 7-10 nm, 7-9 nm, or 8-10 nm.

Preferably, the lithium-containing nanoparticles are surface-capped with one or more types of surface-capping hydrophobic molecules (i.e., surfactants or surface-active molecules). The hydrophobic molecules contain one or more hydrocarbon groups, wherein a hydrocarbon group is understood herein to be composed solely of carbon and hydrogen atoms, unless otherwise specified. The one or more hydrocarbon groups preferably contain at least 6, 7, 8, 9, 10, 11, 12, 14, 16, 18, or 20 carbon atoms each. The hydrocarbon groups can be straight-chained or branched, saturated or unsaturated (e.g., containing one, two, three, or more double and/or triple carbon-carbon bonds), cyclic or acyclic, and aliphatic or aromatic. Preferably, the hydrocarbon groups are straight-chained alkyl groups. Some examples of straight-chained alkyl groups include hexyl, heptyl, octyl, nonyl, decyl, undecyl, tridecyl, tetradecyl, pentadecyl, hexadecyl, heptadecyl, octadecyl, nonadecyl, and eicosyl groups.

In one embodiment, the hydrophobic molecules include primary, secondary, and/or tertiary amine molecules containing at least one hydrocarbon group. In another embodiment, the hydrophobic molecules include carboxylate- or carboxylic acid-containing molecules containing at least one hydrocarbon group. In other embodiments, the hydrophobic molecules include sulfate, sulfite, sulfonate, siloxane, phosphate, phosphinate, phosphite, and/or hydrogenphosphate molecules containing at least one hydrocarbon group.

In a preferred embodiment, $Li_3PO_4$ nanoparticles are prepared by the direct reaction between one or more lithium salts, dispersed in a long chain carboxylic acid or other surfactant, and dry phosphoric acid or phosphate salt. Lithium oxides can be prepared by, for example, the decomposition of lithium acetate in reverse micelles at an elevated temperature (e.g., greater than 200° C.). Other multicomponent lithium oxides can be prepared by, for example, sol-gel reactions of alkoxides and hydroxides of lithium, silicon, and zirconium or by Pechini-type reactions in reverse micelles at elevated temperatures. The precursor (lithium-6)-containing compounds can be obtained or prepared by methods known in the art useful for increasing the percentage of Li-6 as compared to the natural isotopic distribution of lithium, i.e., 7.42% Li-6 and 92.58% Li-7 found in nature.

In general, size control of the lithium-containing nanoparticles is achieved by an appropriate adjustment of certain reaction conditions, particularly temperature, concentration ratio of lithium reactant to surfactants, chain length of surfactants, and reaction time (i.e., heating time after an initial nucleation step). In a preferred embodiment, the particle size is controlled by adjusting the chain length of the surface-capping hydrophobic molecules, in conjunction with adjustments in reaction time. Generally, longer chain surfactants result in smaller nanoparticles, while shorter chain surfactants result in larger nanoparticles due, presumably, to the increased steric hindrance of longer chain surfactants when clustered around the nanoparticle during growth. However, reaction time is at least one factor which affects particle size independently of surfactant chain length. For example, if longer heating times are employed after an initial nucleation step, this will generally result in larger particles, since growth of the particles progresses as heating is continued. Finally, a particular range of particle sizes (or a particle size cut-off) can be achieved by applying a size-separation or size-exclusion method (e.g., a chromatographic or filtration method).

The lithium-containing nanoparticles can have any suitable shape that does not interfere with the ability of the nanoparticles to function as neutron absorbers. Typically, the nanoparticles are substantially or completely spherical. When the nanoparticles are substantially or completely spherical, the above exemplary particle sizes refer to the diameter of the nanoparticles. For nanoparticles that are non-spherical (e.g., elliptical, cylindrical, rod-like, plate-like, rectangular, pyramidal, or amorphous), the above exemplary particle sizes can refer to at least one, two, or three of the dimensional axes of the nanoparticle. For example, in one embodiment, less than three of the dimensional axes of the non-spherical nanoparticles are within the exemplary particle sizes set forth above (i.e., not exceeding 10 nm), while one or two of the dimensional axes are outside of this range (i.e., exceeding 10 nm). In another embodiment, all three dimensional axes of the nanoparticles are within the exemplary particle sizes set forth above, i.e., not exceeding 10 nm.

The one or more non-polar organic solvents used as a medium of the liquid scintillator can be selected from any of the non-polar organic solvents known in the art which are liquids at typical room temperature conditions (e.g., 15-30° C.). The non-polar organic solvent can have any suitable purity level. However, preferably, the solvent has a purity of at least or greater than 95%, 96%, 97%, 98%, 99%, 99.5%, or 99.9%. The non-polar organic solvent is also preferably dry, i.e., substantially free of water.

Preferably, the non-polar organic solvents are hydrocarbon solvents (i.e., composed solely of carbon and hydrogen). Some examples of non-polar liquids include the liquid aliphatic hydrocarbon solvents and the liquid aromatic hydrocarbon solvents. Some examples of liquid aliphatic hydrocarbon solvents include the pentanes, hexanes, heptanes, octanes, decanes, dodecanes, cyclohexane, cycloheptane, cyclooctene, decalin, pentenes, hexenes, heptenes, octanes, decanes, cyclopentene, cyclopentadiene, cyclohexene, 1,3-cyclohexadiene, 1,4-cyclohexadiene, cycloheptene, cyclooctene, cyclooctadiene, and cyclooctatetraene. Some examples of the liquid aromatic hydrocarbon solvents include benzene, toluene, the xylenes (o-, m-, and p-derivatives, and mixtures thereof), the trimethylbenzenes (i.e., 1,2,3-trimethylbenzene, 1,2,4-trimethylbenzene, and 1,3,5-trimethylbenzene), the tetramethylbenzenes (e.g., 1,2,3,4-tetramethylbenzene, 1,2,3,5-tetramethylbenzene, and 1,2,4,5-tetramethylbenzene), ethylbenzene, diethylbenzenes, cumene, vinylbenzene, and divinylbenzenes.

The hydrocarbon solvent may, if desired, contain one, two, three, or more halogen atoms (e.g., fluorine, chlorine, or bromine atoms) per solvent molecule. Some examples of halocarbon solvents include the fluorohydrocarbon (or fluorocarbon) solvents and the chlorohydrocarbon (or chlorocarbon) solvents. Some examples of fluorohydrocarbon (or fluorocarbon) solvents include perfluorohexane, perfluoroheptane, perfluorooctane, perfluorononane, perfluorodecane, fluorobenzene, difluorobenzenes, trifluorobenzenes, tetrafluorobenzenes, pentafluorobenzene, hexafluorobenzene, and trifluoromethylbenzene. Some examples of chlorohydrocarbon (or chlorocarbon) solvents include methylene chloride, chloroform, carbon tetrachloride, tetrachloroethylene, chlorobenzene, dichlorobenzenes, trichlorobenzenes, and chlorotoluenes.

Preferably, in order to promote electronic transfer in the liquid, the one or more non-polar organic solvents include at least one aromatic non-polar organic solvent. In a preferred embodiment, the one or more non-polar organic solvents are exclusively aromatic.

Preferably, polar solvents are excluded from the liquid scintillating composition. Some examples of polar solvents which are preferably excluded include water, the alcohols (e.g., methanol, ethanol, isopropanol), ethers (e.g., dimethylether, diethylether, diisopropylether, diisobutylether, methyl (t-butyl)ether, tetrahydrofuran), the nitriles (e.g., acetonitrile, propionitrile, butyronitrile), the sulfoxides (e.g., dimethylsulfoxide), the amides (e.g., N,N-dimethylformamide, N,N-dimethylacetamide, N-methylpyrrolidinone), the amines, and the carboxylic acids, and esters and anhydrides thereof.

The one or more fluorophores are any compounds or materials known to fluoresce (i.e., emit light) when impinged by energy (e.g., at least one ionizing particle) resulting from the decay of lithium-6. The fluorophore should be fully soluble in the liquid scintillating composition (i.e., solution). This is typically achieved by selecting one or more fluorophores that are completely soluble in the non-polar solvent (matrix) being used.

In one embodiment, the one or more fluorophores include one or more fluorescent metal-chalcogenide nanoparticles. Some examples of suitable metal-chalcogenide nanoparticles include those containing one or more metals selected from cadmium (Cd) and zinc (Zn) and one or more chalcogenides selected from sulfide, selenide, and telluride. Some examples of metal-chalcogenide compositions include CdS, CdSe, CdTe, ZnS, ZnSe, and ZnTe. Core-shell configurations of these compositions are also useful (e.g., CdSe core with a ZnS shell, or a silver (Ag) core with a ZnS shell). In different embodiments, the particle size of the metal-chalcogenide nanoparticles are at least, at most, or approximately 1 nm, 2 nm, 5 nm, 10 nm, 15 nm, 20 nm, 25 nm, 30 nm, 40 nm, 50 nm, 60 nm, 70 nm, 80 nm, 90 nm, 100 nm, 120 nm, 150 nm, 200 nm, 250 nm, 300 nm, 350 nm, 400 nm, 450 nm, 500 nm, 550 nm, or 600 nm, or a particle size within a particular range bounded by any two of these values. Preferably, the metal chalcogenide nanoparticles are surface-capped by hydrophobizing groups such that the metal-chalcogenide nanoparticles are rendered completely soluble in the liquid scintillating composition. Some examples of surface-capping hydrophobizing groups include hydrophobic long-chain thiol, thioether, disulfide, or phosphine molecules having one or more hydrocarbon groups as described above, and preferably, one or more hydrocarbon chains of, for example, at least 6, 7, 8, 9, 10, 11, 12, 14, 16, 18, or 20 carbon atoms, or a range of carbon atoms bounded by any two of these values. In different embodiments, the metal chalcogenide nanoparticles are included in the solution in a weight percentage per total weight or volume of the solution of 1%, 2%, 5%, 10%, 15%, or 20%.

In another embodiment, the one or more fluorophores include one or more lanthanum oxide (e.g., $Y_2O_3$) or lanthanum phosphate (e.g., $LaPO_4$) nanoparticles. Preferably, the lanthanum oxide or phosphate nanoparticles are doped with a suitable rare earth element, such as cerium (Ce). The dopant can be present in any suitable molar amount with respect to the nanoparticle. For example, in different embodiments, the dopant is in an amount of, or at least, or no more than 0.1, 0.5, 1.0, 2.0, 5.0, 10, 15, 20, 25, 30, or 40 mole percent of the nanoparticle. Some examples of doped lanthanum oxide or lanthanum phosphate compositions include $Y_2O_3$:Ce and $LaPO_4$:Ce. Preferably, the lanthanum oxide and phosphate nanoparticles are surface-capped by hydrophobizing molecules, such as hydrophobic long-chain phosphate, hydrogenphosphate, phosphonate, phosphinate, phosphite, siloxane, sulfate, sulfite, sulfonate, or carboxylate molecules having one or more hydrocarbon groups, as described above, and more preferably, one or more hydrocarbon chains of, for example, at least 6, 7, 8, 9, 10, 11, 12, 14, 16, 18, or 20 carbon atoms, or within a range bounded by any two of these values.

In another embodiment, the one or more fluorophores include one or more organic and non-polar fluorophores which are soluble in the non-polar solvent matrix. In a particularly preferred embodiment, the one or more organic and non-polar fluorophores are selected from one or a combination of 5-diphenyloxazole (PPO) and 1,4-bis-2-(5-phenyloxazolyl)benzene (POPOP). Another suitable fluorophore is 2,5-bis(5-tert-butyl-2-benzoxazolyl)thiophene (BBOT), which emits lower energy radiation of the visible spectrum (i.e., 400-450 nm).

Preferably, the liquid scintillator composition further includes one or more energy transfer facilitator (ETF) substances. The ETF substance is preferably a polycyclic aromatic hydrocarbon compound containing at least, for example, 10, 11, 12, 13, 14, 15, 16, 17, 18, 19, 20, 21, 22, 23, or 24 carbon atoms, or alternatively, at least two, three, or four fused or linked aromatic rings. In one embodiment, a single ETF substance is included, while in other embodiments, two, three, or four ETF substances are included. Some examples of such compounds include naphthalene, anthracene, 9,10-diphenylanthracene, biphenyl, phenalene, cyclopentadiene, indene, tetracene, pyrene, azulene, fluorene, chrysene, triphenylene, styrene, and stilbene.

In another aspect, the invention is directed to a liquid scintillator device containing the above liquid scintillating composition. The liquid scintillator device contains any of the components commonly used in liquid scintillator devices. For example, the liquid scintillator device will necessarily include a space for holding the scintillating liquid. The device also typically includes a component which detects or amplifies the emitted scintillation light, e.g., a photomultiplier tube or photodiode.

Examples have been set forth below for the purpose of illustration and to describe certain specific embodiments of the invention. However, the scope of this invention is not to be in any way limited by the examples set forth herein.

Example 1

General Procedures and Conditions

All solvents were dried and degassed because absence of water and air are essential for PSD performance. The preparation of lithium-loaded liquid scintillators was carried out under an inert atmosphere. 1,2,4-trimethylbenzene and xylenes were vacuum distilled over sodium and degassed by a conventional freeze pump thaw method to thoroughly remove water and air. Scintillation grade naphthalene was purified by sublimation. A fluorophore-toluene solution containing PPO and POPOP fluorophores with a PPO concentration of 0.45 M was premade. A quartz cylindrical cell with a path length of 10 mm and a volume of 2.8 mL from Starna Cells was used as a sample cell.

Example 2

Preparation of $^6Li_3PO_4$ Nanoparticles

Phenyl ether (12 g), tributyl phosphate (6.5 g), and oleic acid (5 g) were weighed into a 250 mL three-neck round-bottom flask equipped with a temperature controller and a magnetic stir bar. The solvent mixture was degassed and then lithium oleate (2 g) added. The reaction mixture was heated to 140° C. and kept at that temperature for about 10 minutes. The heat was then removed, and trioctylamine (5.5 g) and a mixture of dodecylamine (3.1 g), hexylether (5.0 mL), and bis(2-ethylhexyl)hydrogen phosphate (5.5 mL) were injected into the reaction mixture, respectively, at 100° C. at a point in the early stages of nucleation. For growth of the particles to a desired size range, the reaction mixture was stirred at 100° C. for 1 hour and then cooled to room temperature. $Li_3PO_4$ nanoparticles were obtained via precipitation with anhydrous isopropyl alcohol. The resulting white solid was further washed with anhydrous isopropyl alcohol three times to remove impurities.

The X-ray powder diffraction method (XRD) and transmission electron microscopy (TEM) were used to determine the particle size of the $Li_3PO_4$ nanoparticles. Analysis of the XRD pattern with Scherrer formula as well as TEM images revealed uniformly distributed spherical particles having a particle size of 4-9 nm.

It is noteworthy that several factors affect the ultimate size of the particles. These factors include, for example, the temperature of the growth step (i.e., higher temperatures favor larger particles and wide size distribution while lower temperatures favor smaller particles and lower crystallinity), the duration of the growth step (i.e., longer times favor larger particles), the point at which surface-capping agents, such as trioctylamine, are injected into the solution (i.e., relative to the start of nucleation), and the molar ratio of lithium precursor (e.g., lithium oleate) to surface capping molecules. For example, it was observed that when the above method is practiced with the modification that a lower concentration of dodecylamine and bis(2-ethylhexyl)hydrogen-phosphate is used in the reaction mixture, the result is an increase in particle size. It was also observed that when the above method is practiced with the modification that lower concentrations of trioctlyamine and bis(2-ethylhexyl)hydrogenphosphate are used as surfactants in the absence of dodecylamine, larger particles result.

Example 3

Preparation of Liquid Scintillating Composition
(Route I)

Samples 2 and 3

Sample 2 (0.8 wt % Li): 160 mg of $^6Li_3PO_4$ nanoparticles were dissolved in 1.8 g 1,2,4-trimethylbenzene in a glass vial and sonicated for 30 minutes. 500 mg naphthalene (17.5 wt %) and 400 mg toluene solution of PPO/POPOP (13.9 wt %) liquid fluorophore were then introduced into the mixture, respectively. The resulting solution was sonicated for another 30 minutes, and then transferred into a 10 mm path length cylindrical quartz cell under an inert atmosphere, and then tightly capped.

Sample 3 (1.1 wt % Li): 220 mg of $^6Li_3PO_4$ nanoparticles were dissolved in 1.8 g xylenes (mixture of isomers) in a glass vial and sonicated for 30 minutes. 520 mg naphthalene (17.7 wt %) and 400 mg toluene solution of PPO/POPOP (13.6 wt %) liquid fluorophore were then introduced into the mixture, respectively. The resulting solution was sonicated for another 30 minutes, and then transferred into a 10 mm path length cylindrical quartz cell under an inert atmosphere, and then tightly capped.

Example 4

Preparation of Liquid Scintillating Composition
(Route II)

Sample 1, 1.0 wt % Li 200 mg of $^6Li_3PO_4$ nanoparticles (1.0 wt %) were dissolved in 2.7 g EJ-301 commercial liquid mixture in a glass vial, and the resulting solution sonicated for 30 minutes. The resulting mixture was then transferred into a 10 mm path length cylindrical quartz cell under an inert atmosphere, and then tightly capped.

Example 5

Analysis of Liquid Scintillating Compositions

Neutron detection measurements were conducted by placing the sample cell containing the liquid scintillator mixture onto a photomultiplier tube (PMT). The PMT was positioned in front of a heavily moderated $^{241}$AmLi neutron source. The samples were exposed to thermal neutrons for 8000 seconds and their responses were presented as pulse height spectra.

Figure 2:
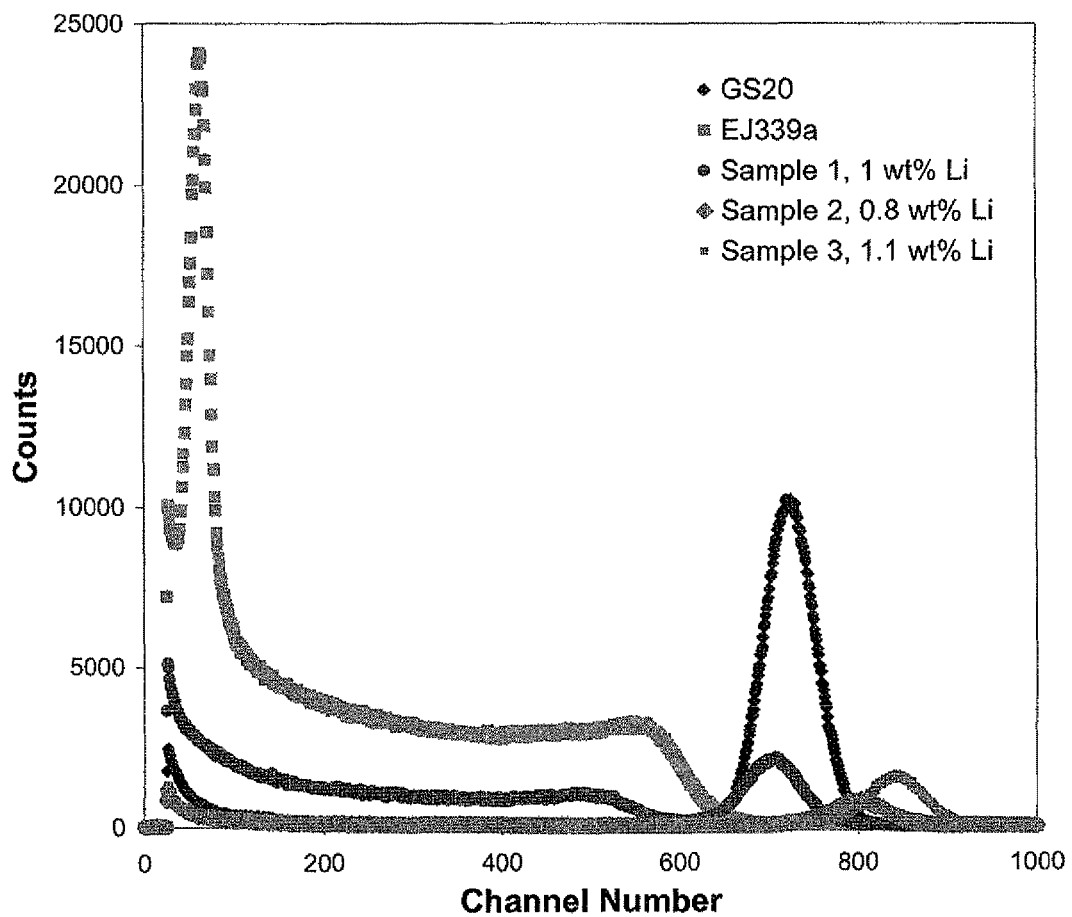
FIG. 2. Superimposed neutron pulse height spectra. Sample 1, 1.0 wt % lithium-6 (loaded liquid scintillator prepared by Route II (i.e., $^6$Li$_3$PO$_4$ nanoparticles loaded in EJ-301 commercial liquid scintillator). Sample 2, 0.8 wt % lithium-6 loaded liquid scintillator prepared by Route I (prepared directly). Sample 3, 1.1 wt % lithium-6 loaded liquid scintillator prepared from Route I. EJ339A, Commercial boron-10 loaded liquid scintillator. GS20, Commercial lithium-6 loaded glass scintillator.

As shown by FIG. 1, the lithium-6 loaded liquid scintillator, as prepared above, possess light outputs and PSD properties necessary for achieving an effective discrimination against gamma events. As shown by FIG. 2, the light output of the liquid scintillator based on Route I with 1.1 weight % lithium-6 concentration (Sample 3) is higher than the light output of lithium-6 doped commercial glass neutron scintillator GS20 (Applied Scintillation Technology), which is a lithium-containing (6.6 wt % Li-6) glass scintillator commercially available for neutron detection from Saint-Gobain.

As shown by FIG. 2, the light outputs of Samples 1, 2 and 3 were higher than EJ339A, which is a boron-loaded liquid neutron scintillator (4.6 wt % B-10) commercially available from Eljen Technology. The horizontal axis (i.e., channel number) shows the light output of a sample. Therefore, higher channel number indicates higher light output, and thus, a brighter sample. The vertical axis (i.e., count rate) is indicative of the number of neutron capture events of a particular sample. Neutron detection measurements on Samples 2 and 3 revealed higher channel numbers than GS20 under the same conditions. Sample 3 has the highest light output and PSD characteristics based on these results.

The unique approach described herein provides significantly higher lithium content in lithium-loaded liquid scintillators, thereby leading to improved neutron counts in these scintillators. Since the transparency of the liquid is not diminished even with high lithium-6 content, the high light output is advantageously maintained.

While there have been shown and described what are at present considered the preferred embodiments of the invention, those skilled in the art may make various changes and modifications which remain within the scope of the invention defined by the appended claims.

What is claimed is:

1. A liquid scintillating composition comprising:
   (i) one or more non-polar organic solvents;
   (ii) (lithium-6)-containing nanoparticles having a size of up to 10 nm and surface-capped by hydrophobic molecules; and
   (iii) one or more fluorophores.

2. The liquid scintillating composition of claim 1, wherein the one or more non-polar organic solvents include an aromatic hydrocarbon solvent.

3. The liquid scintillating composition of claim 1, wherein the aromatic hydrocarbon solvent comprises a xylene.

4. The liquid scintillating composition of claim 1, wherein the one or more fluorophores are selected from organic fluorophores.

5. The liquid scintillating composition of claim 4, wherein the one or more fluorophores are selected from 2,5-diphenyloxazole and 1,4-bis-2-(5-phenyloxazolyl)benzene.

6. The liquid scintillating composition of claim 1, wherein the one or more fluorophores are selected from metal-chalcogenide fluorophores.

7. The liquid scintillating composition of claim 6, wherein the metal-chalcogenide fluorophores comprise nanoparticles of a sulfide, selenide, or telluride material of Cd, Zn, or a combination thereof.

8. The liquid scintillating composition of claim 1, wherein the one or more fluorophores are selected from $LaPO_4$ nanoparticles doped with one or more rare earth metals.

9. The liquid scintillating composition of claim 1, wherein the hydrophobic molecules include one or more hydrocarbon groups containing at least six carbon atoms each.

10. The liquid scintillating composition of claim 1, further comprising an energy transfer facilitator substance.

11. The liquid scintillating composition of claim 10, wherein the energy transfer facilitator substance comprises naphthalene.

12. The liquid scintillating composition of claim 1, wherein the composition possesses a lithium loading of at least 1.0 weight percent.

13. The liquid scintillating composition of claim 1, wherein the composition possesses a lithium loading of at least 1.5 weight percent.

14. The liquid scintillating composition of claim 1, wherein the composition possesses a lithium loading of at least 2.0 weight percent.

15. The liquid scintillating composition of claim 1, wherein the (lithium-6)-containing nanoparticles are lithium-6 phosphate nanoparticles.

16. The liquid scintillating composition of claim 1, wherein the (lithium-6)-containing nanoparticles have a size of 1-5 nm.

17. The liquid scintillating composition of claim 1, wherein the (lithium-6)-containing nanoparticles have a size of 1-3 nm.

18. The liquid scintillating composition of claim 1, wherein the (lithium-6)-containing nanoparticles have a size of 3-5 nm.

19. The liquid scintillating composition of claim 1, wherein the (lithium-6)-containing nanoparticles have a size of about 1 nm.

20. A liquid scintillator device containing the liquid scintillating composition of claim 1.

* * * * *